United States Patent [19]
Zeidler

[11] Patent Number: 4,819,974
[45] Date of Patent: Apr. 11, 1989

[54] PIPE COUPLING

[75] Inventor: Siegmund Zeidler, Hanau, Fed. Rep. of Germany

[73] Assignee: Rasmussen GmbH, Maintal, Fed. Rep. of Germany

[21] Appl. No.: 79,659

[22] Filed: Jul. 29, 1987

[30] Foreign Application Priority Data

Aug. 2, 1986 [DE] Fed. Rep. of Germany ....... 3626289
Sep. 22, 1986 [DE] Fed. Rep. of Germany ....... 3632127

[51] Int. Cl.⁴ ............................................. F16L 21/06
[52] U.S. Cl. .................................... 285/373; 285/104; 285/382.7; 285/404
[58] Field of Search ................... 285/340, 382.7, 373, 285/404, 104

[56] References Cited

U.S. PATENT DOCUMENTS

| | | | |
|---|---|---|---|
| 2,225,208 | 12/1940 | Crickmer | 285/373 X |
| 2,459,251 | 1/1949 | Stillwagon | 285/373 X |
| 3,233,926 | 2/1966 | Müller | 285/382.7 X |
| 3,432,189 | 3/1969 | Buller | 285/340 X |
| 3,790,194 | 2/1974 | Kimberley | 285/373 |
| 4,047,743 | 9/1977 | Weintraub et al. | 285/340 |
| 4,438,954 | 3/1984 | Hattori | 285/404 X |
| 4,676,531 | 6/1987 | Martin | 285/382.7 X |
| 4,676,533 | 6/1987 | Gerondale | 285/382.7 X |

FOREIGN PATENT DOCUMENTS 3443943 6/1985 Fed. Rep. of Germany .

Primary Examiner—Thomas F. Callaghan
Attorney, Agent, or Firm—Peter K. Kontler

[57] ABSTRACT

A pipe coupling wherein a composite housing surrounds the objects or parts to be coupled with one another. The housing confines two annular gripping members, one for each part and each having a trapeziform cross-sectional outline with two oppositely inclined legs flanking an annular web which can be biased toward the respective part by a set of screws mating with the housing. The radially innermost portions of the legs have teeth which penetrate into the material of the respective parts to hold the parts against axial movement relative to each other. Each gripping member can be received in a discrete groove which has a trapeziform cross-sectional outline and is bounded in part by two oppositely inclined flanks whose inclination with reference to the axis of the housing is more pronounced than the inclination of the legs on the gripping members. The teeth of the legs of the gripping members are immediately adjacent the respective flanks. Alternatively, both gripping members can be installed in a common groove of the housing.

23 Claims, 3 Drawing Sheets

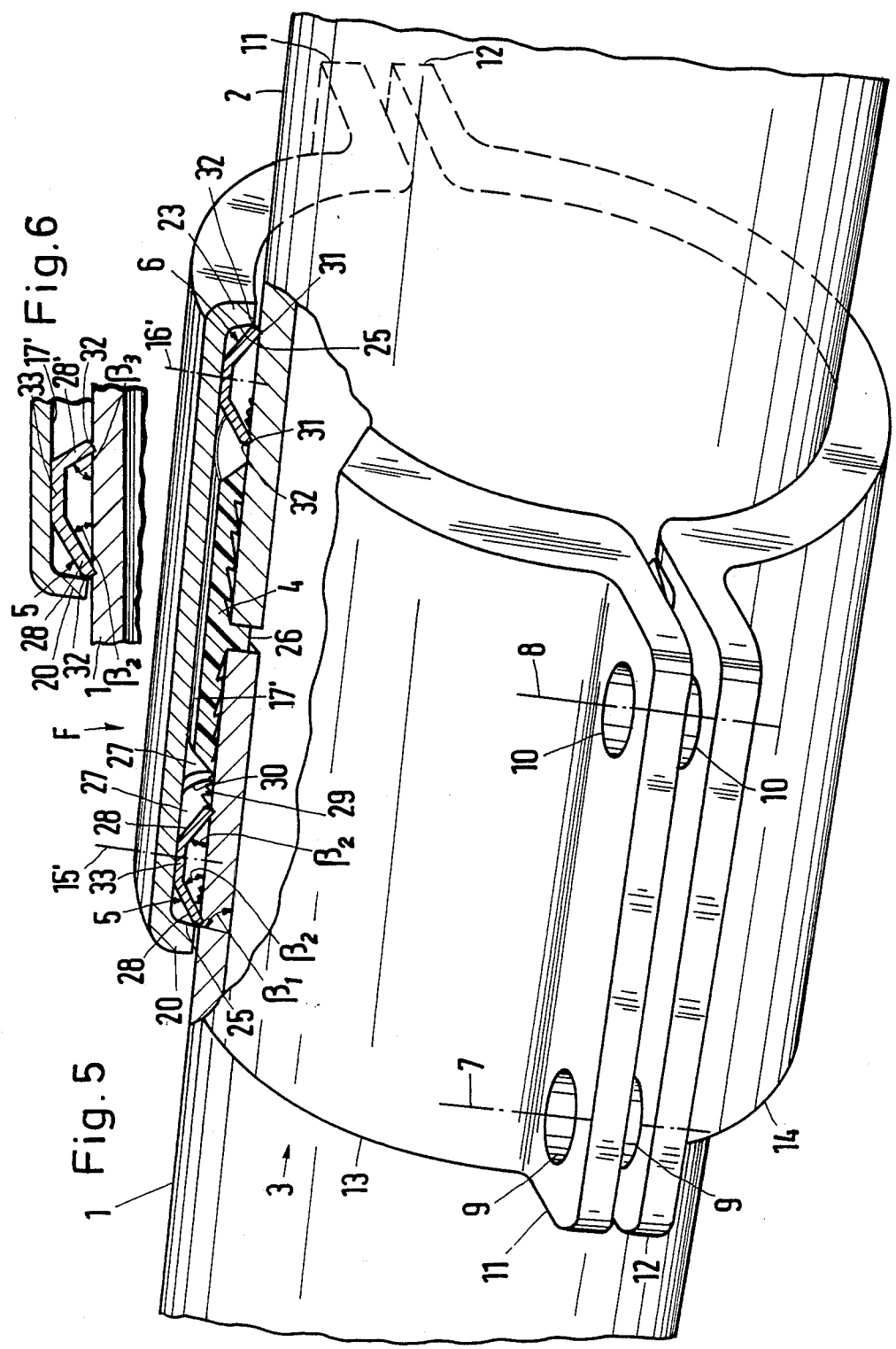

4,819,974

PIPE COUPLING

CROSS-REFERENCE TO RELATED CASE

The coupling of the present invention constitutes an improvement over and a further development of the coupling which is disclosed in commonly owned patent application Ser. No. 883,072 filed Jul. 8, 1986 for "Pipe Coupling" now U.S. Pat. No. 4,729,582.

BACKGROUND OF THE INVENTION

The invention relates to couplings in general, and more particularly to improvements in pipe couplings, especially threadless pipe couplings. Still more particularly, the invention relates to improvements in couplings of the type wherein the parts or objects (e.g., two coaxial pipes) which are to be connected to each other are surrounded by a housing for one or more gripping or clamping elements with sharp or sharpened portions serving to penetrate into the surfaces of the respective objects.

It is known to provide a pipe coupling with a composite tubular housing whose internal surface has grooves for gripping members which are caused to engage the adjacent pipes when the housing is assembled to surround the abutting or neighboring end portions of the pipes. In accordance with one presently known proposal, the housing has two internal grooves each of which receives three arcuate gripping members which are spaced apart from each other in the circumferential direction of the housing and are tiltable about axes located in planes including the axis of the housing. The radially innermost portions of the gripping members have sets of teeth which penetrate into the material of the adjacent objects (e.g., pipes) in response to tilting of the gripping members relative to the housing. The gripping members are tilted in response to axial movements of the pipes toward or away from each other, and the extent of such tilting is limited by the surfaces bounding the respective groove. Once a gripping element abuts the adjacent surface in the corresponding groove, it holds the respective pipe against further axial movement relative to the other pipe. A drawback of such couplings is that the pipes can perform relatively large axial movements toward or away from each other before the tiltable gripping members become effective.

In accordance with another prior proposal, the housing of the pipe coupling confines roller-shaped gripping or clamping members which extend in the axial or in the circumferential direction of the pipes and have external surfaces provided with teeth which penetrate into the material of the adjacent pipes. Each gripping member is installed in a discrete recess of the housing which forms part of the coupling. Certain surfaces which bound such discrete recesses serve to limit the extent of movement of the respective roller-shaped gripping members in the axial direction of the pipes; these surfaces extend in the circumferential direction of the housing. A drawback of such pipe couplings is that the assembly of a large number of roller-shaped gripping members with their housing takes up much time and also that the making of a large number of recesses in the internal surface of the housing is a costly operation.

It is further known to provide the housing of a pipe coupling with internal grooves for ring-shaped gripping members having a substantially frustoconical profile. The smaller-diameter portion of each ring-shaped gripping member is formed with axially extending slits to provide a number of laminations which alternate with the slits and overlap each other in the circumferential direction of the respective gripping member. The laminations are supposed to constitute claws which penetrate into the material of the adjacent pipe. When the pipes which are connected to each other by the just described coupling tend to move axially and away from each other, the inclination of the ring-shaped gripping members changes and the gripping members begin to offer a pronounced resistance to separation of the pipes. However, such changes in the inclination of ring-shaped gripping members necessitate the application of a very large force which can be generated in response to a pronounced axial shifting of the pipes away from each other so that the coupling becomes effective with a pronounced delay following the start of axial movement of one of the pipes away from the other pipe and/or vice versa. The claws of the ring-shaped gripping members tend to scrape off some material of the pipes, and the accumulations of the scraped off material are intended to constitute obstructions which ultimately prevent further sliding of the claws along the pipes and cause a change in the orientation of the respective ring-shaped gripping members to thereby terminate the axial movements of the pipes away from each other.

German Offenlegungsschrift No. 34 43 943 of Hurter discloses a pipe coupling wherein the housing includes two identical shells serving to confine a one-piece sealing member having sealing lips. The housing is further formed with internal annular grooves which flank the sealing ring and confine gripping members which are urged against the respective pipes in response to assembly of the housing and tightening of the sealing lips around the pipes by means of bolts and nuts which hold the shells of the housing against pivotal movement away from each other. The gripping members are tiltable in their grooves in response to axial movements of the pipes relative to each other. Each gripping member is a laminar body which is made of steel.

U.S. Pat. No. 2,459,251 to Stillwagon discloses a threadless pipe coupling which is similar to the pipe coupling of Hurter except that the ring-shaped sealing element is flanked by two sets of tiltable gripping members in the form of arcuate plate-like dogs.

U.S. Pat. No. 2,225,208 to Crickmer discloses a pipe coupling wherein an elastic packing ring is flanked by two gripping members each of which includes a substantially cylindrical portion and a radially inwardly bent flange capable of penetrating into the material of the adjacent pipe when the pipes tend to move axially and away from each other.

U.S. Pat. No. 4,438,954 to Hattori discloses a pipe coupling with two concavo-convex split ring-shaped gripping members which have a certain freedom of axial movement in the respective internal annular grooves of the housing. The gripping members have pairs of sharp edges which are supposed to penetrate into the peripheral surfaces of the respective pipes in response to axial movement of the pipes relative to each other.

OBJECTS AND SUMMARY OF THE INVENTION

An object of the invention is to provide a coupling wherein the objects which are connected to each other are held by simple, compact and inexpensive gripping means and such gripping means can be installed in or removed from their housing in a simple and time-saving manner.

Another object of the invention is to provide a coupling which can effectively prevent practically all axial movements of the coupling objects toward or away from each other.

A further object of the invention is to provide the coupling with novel and improved means for centering and properly orienting the gripping means.

An additional object of the invention is to provide novel and improved gripping means for use in the above outlined coupling.

Still another object of the invention is to provide a novel and improved housing for the gripping means.

A further object of the invention is to provide a coupling which can connect tubular or solid cylindrical objects to similar or otherwise configurated objects and wherein such objects are automatically engaged and held by the gripping means in response to proper assembly and mounting of the housing.

Another object of the invention is to provide a coupling, particularly a threadless pipe coupling, wherein the force with which the interconnected objects are held against movement toward and/or away from each other can be altered within any desired practical range upon completed assembly of the coupling.

The invention is embodied in a coupling for pipes and similar objects, particularly in a threadless pipe coupling. The improved coupling comprises a composite tubular housing having an internal surface which surrounds the objects to be coupled to each other when the housing is applied around such objects, and at least one annular groove which is machined into or is otherwise formed in the internal surface. The housing includes two annular portions which flank the groove and have oppositely inclined flanks which may diverge toward the internal surface and make first acute angles with the axis of the housing. The coupling further comprises an annular gripping member in the groove, and such gripping member includes a web and two oppositely inclined legs which flank the web and have teeth in the region of the internal surface of the housing to penetrate into the object which is surrounded by the groove. At least one of the legs makes with the axis of the housing a second acute angle smaller than the first angle, and the teeth of the one leg are closely or immediately adjacent one annular portion of the housing. The teeth of both legs can be closely or immediately adjacent different annular portions of the housing.

The internal surface can be provided with at least one additional annular groove which is spaced apart from the one groove in the axial direction of the housing so that each of the grooves surrounds a different one of those objects which are surrounded by the internal surface and are to be coupled to each other. The housing can have additional annular portions which flank the additional groove, and the coupling can further comprise an additional gripping member in the additional groove.

Each gripping member can comprise a plurality of interconnected arcuate sections. In accordance with a presently preferred embodiment of the invention, each gripping member is a one-piece member having a plurality of neighboring arcuate sections. Each gripping member can have a substantially trapezoidal cross-sectional outline, the same as each groove in the internal surface of the housing.

Each gripping member preferably comprises at least two neighboring arcuate sections of deformed sheet material (such as spring steel), and the teeth of the legs of such arcuate sections form arcs with radii of curvature slightly less than the radius of the internal surface of the housing. Each gripping member is preferably provided with recesses between the legs of neighboring arcuate sections and at least some of the teeth can have a sawtooth-shaped profile. The width of the recesses can decrease in directions from the respective teeth toward the web of the respective gripping member, at least prior to bending of the respective web into an arcuate or circular shape. The neighboring sections can constitute stampings with burrs which form part of or constitute the teeth of the arcuate sections. Such burrs are preferably spaced apart from the respective annular portions of the housing, and the teeth of the one leg can further include rounded (e.g., chamfered) portions which are adjacent and can abut the one annular portion of the housing.

The inclination of the legs is preferably between 0.36 and 0.58, most preferably approximately 0.47.

The teeth preferably project beyond the internal surface of the housing, and the coupling can further comprise means for biasing the gripping member or members radially inwardly so as to even more reliably engage the teeth with the adjacent portions of the objects which are surrounded by the housing. The biasing means can include at least one threaded portion (such as the shank of a screw) which is received in a tapped bore of the housing and whose tip engages the web of the respective gripping member to urge the web radially inwardly.

A single groove of the housing can accommodate two axially spaced-apart annular gripping members. The one leg of the one gripping member is then closely or immediately adjacent the flank of the one annular portion, and one leg of the other gripping member is then immediately or closely adjacent the flank of the other annular portion. The other leg of the one gripping member and the other leg of the other gripping member are spaced apart from each other and from the annular portions of the housing.

The coupling can comprise rivets, screws, spot welds or other suitable means for fastening the gripping member or members to the housing.

The other leg of each gripping member can make with the axis of the housing a third acute angle which is different (particularly greater) than the second acute angle and which can be less than the first acute angle.

The entire housing can be made of sheet metal, especially if such housing need not be provided with more than two annular portions.

The novel features which are considered as characteristic of the invention are set forth in particular in the appended claims. The improved coupling itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 5 is a perspective view of a modified pipe coupling with portions of the housing, pipes, gripping members and packing ring broken away; and FIG. 6 is a fragmentary axial sectional view of a third pipe coupling.

DESCRIPTION OF THE PREFERRED EMBODIMENTS

Figure 1:
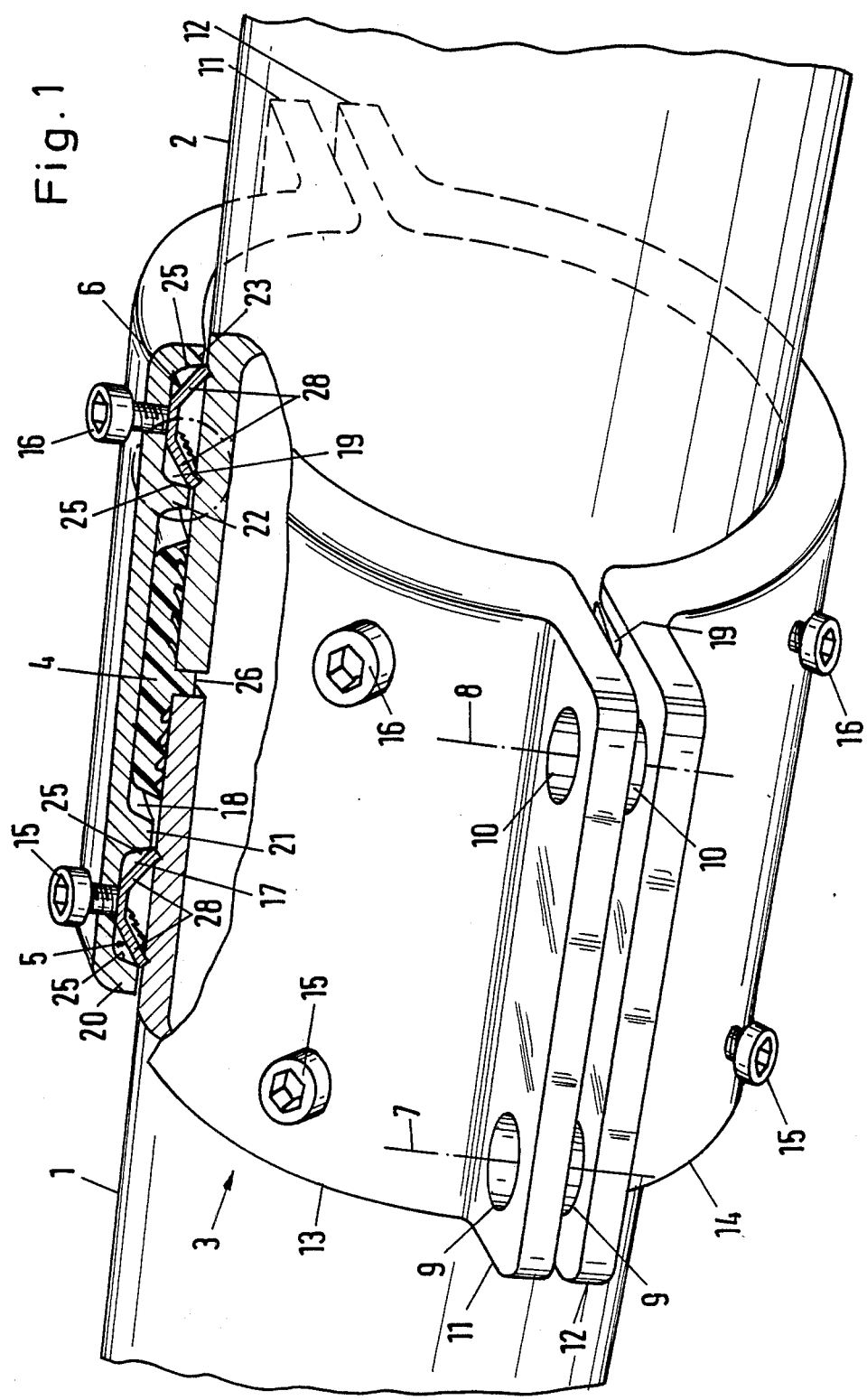
FIG. 1 is a perspective view of a threadless pipe coupling which embodies one form of the invention, a portion of the housing being broken away to expose portions of two gripping members and a packing ring or sleeve between the gripping members.

FIG. 1 shows a threadless coupling which is used to sealingly connect two coaxial pipes 1 and 2 end-to-end. In the embodiment which is shown in FIG. 1, the inner and outer diameters of the pipe 1 are identical or nearly identical to the respective diameters of the pipe 2. The coupling comprises a composite two-piece housing 3 having two identical or similar semicylindrical shells 13 and 14 with pairs of radially outwardly extending axially parallel flanges 11 and 12, respectively. Each flange has two spaced-apart holes 9, 10 for the shanks of bolts 7 and 8 (indicated by phantom lines) which cooperate with nuts (not shown) to urge each flange 11 toward the respective flange 12 and to thus maintain an elastic packing ring or sleeve 4 in sealing engagement with the peripheral surfaces of the pipes 1 and 2. The sleeve 4 has a circumferentially complete internal annular rib 26 which is located between the end faces of the pipes 1 and 2.

The sleeve 4 is confined in a substantially centrally located annular groove 18 which is machined into or is otherwise formed in the internal surfaces of the shells 13, 14 and is flanked by two additional internal annular grooves 17, 19. The grooves 17, 19 respectively serve to confine the major portions of two annular gripping or clamping members 5 and 6 each of which has a web 33 (see FIG. 4) and two oppositely inclined legs 28 which flank the respective web and have annuli of preferably sawtooth-shaped claws or teeth 29 which extend beyond the internal surface of the housing 3 and penetrate into or are held in pronounced frictional engagement with the peripheral surfaces of the respective pipes 1 and 2. The web 33 of the gripping member 5 can be biased radially inwardly by the externally threaded shank or shanks of one or more biasing devices 15 in the form of screws which extend into tapped bores of the shells 13, 14. For example, each of the shells 13, 14 can be provided with three circumferentially spaced-apart tapped bores for discrete screws 15. Analogously, the annular web 33 of the gripping member 6 can be biased radially inwardly by one or more screws 16 whose externally threaded portions extend into tapped bores provided in the shells 13, 14 radially outwardly of the respective web 33. The screws 15 and 16, as well as the tapped bores in the shells 13, 14, constitute optional but desirable and advantageous features of the improved coupling.

The grooves 17, 18 and 19 are interrupted only in the regions of the gaps between neighboring pairs of flanges 11, 12 and each of the gripping members 5, 6 can constitute a one-piece split ring which extends along an arc of approximately 360°. The groove 17 is flanked by two annular portions 20, 21 of the housing 3, and the groove 19 is flanked by two annular portions 22, 23. The annular portions 21, 22 flank the groove 18 for the sealing sleeve 4. The annular portions 20, 23 are radially inwardly extending collars and the annular portions 21, 22 are radially inwardly extending ribs of the housing 3. Each of the grooves 17–19 has a substantially trapezoidal cross-sectional outline, the same as the gripping members 5 and 6. The inclination of flanks 25, which are provided on the annular portions 20–23, with reference to the axis of the housing 3 is much more pronounced than the inclination of webs 28 of the gripping members 5, 6 with reference to such axis. This can be seen in FIG. 4 wherein the angle $beta_1$ (denoting the inclination of the flanks 25 relative to the axis of the housing 3) is much larger than the angle $beta_2$ denoting the inclination of the webs 28 with reference to such axis.

If desired or necessary, the elastic sleeve 4 can be surrounded by a discrete second sleeve or muff of a metallic or plastic material with radially inwardly extending collars adjacent the annular portions 21, 22 of the housing 3. The additional sleeve or muff can resemble a split ring with two neighboring end portions which are accessible through a window in one of the shells 13, 14 and can be clamped to each other by a discrete clamping device (not shown) to urge the sleeve 4 against the adjacent portions of the peripheral surfaces of the pipes 1, 2 and to reliably maintain the rib 26 in the space between the end faces of the pipes.

Figure 2:
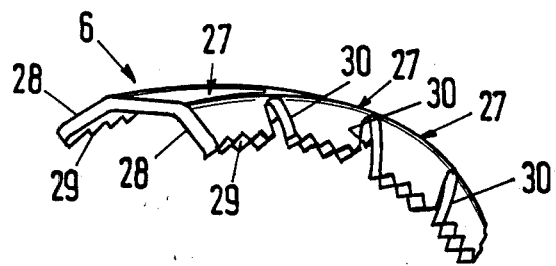
FIG. 2 is a fragmentary perspective view of one of the gripping members.

FIG. 2 shows a portion of the gripping member 6. This gripping member is preferably identical with the gripping member 5 and consists of a set of neighboring arcuate sections 27 which are integral with one another and can be formed from a flat blank of the type shown in FIG. 3. The curvature of the web 33 and legs 28 of each gripping member corresponds to the curvature of the respective groove 17 or 19 in the internal surface of the housing 3. The angle $beta_2$ is preferably between 20° and 30°, most preferably about 25°. This corresponds to an inclination or slope (tangent $beta_2$) of the legs 28 in the range of 0.36 to 0.58, most preferably about 0.47.

As mentioned above, each of the annular gripping members 5, 6 can constitute a one-piece split ring. However, it is equally possible to assemble each gripping member of two or more discrete components, e.g., of two components each of which extends along an arc of approximately 180°. The provision of at least one slit in each of the gripping members 5, 6 is desirable and advantageous in order to ensure that the diameter of each of these gripping members can be reduced in response to the application of bolts 7, 8 and corresponding nuts, i.e., in response to movement of neighboring flanges 11, 12 toward each other in order to place and maintain the sleeve 4 in requisite sealing engagement with the adjacent end portions of the pipes 1 and 2.

Figure 3:
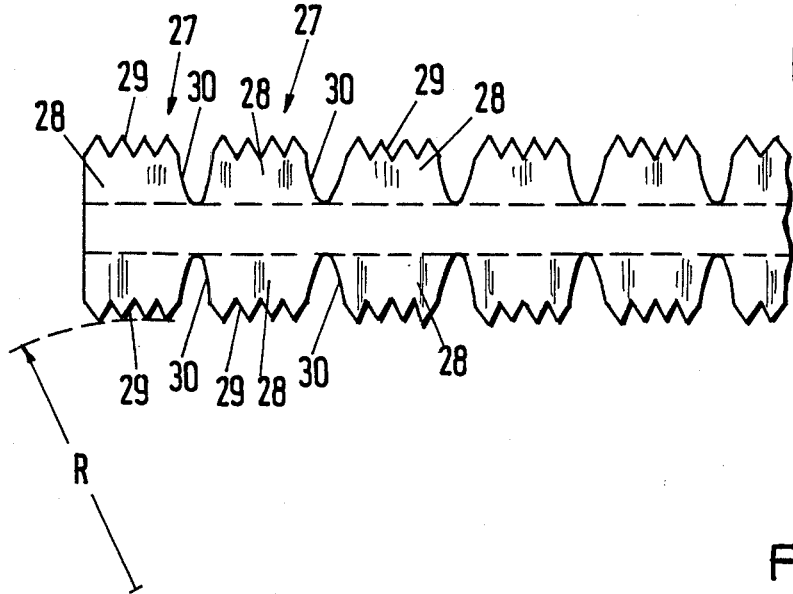
FIG. 3 is a fragmentary plan view of a blank which is about be converted into one of the gripping members.

Referring again to FIG. 3, the blank which is shown therein can be made of spring steel in a stamping or like machine which provides the blank with a centrally and longitudinally extending portion to be converted into the web 33 of the finished gripping member and with two composite legs 28 whose sections are separated from each other by substantially U-shaped or V-shaped recesses 30 which diverge in a direction from the web toward the respective claws or teeth 29, at least prior to conversion of the blank of FIG. 3 into a gripping member of the type shown in FIG. 2. As can be seen in FIG. 3, the teeth 29 on each section of each leg 28 are disposed at the periphery of a circle having a radius R (see also FIG. 4) which is slightly less than the radius $R_i$ of the internal surface of the housing 3 when the latter is properly applied around the pipes 1 and 2. Once the making of the blank of FIG. 3 is completed, the blank is shaped in a suitable deforming machine so as to convert its central portion into an annular web 33 and to convert the lateral portions into two legs 28 each of which has a set of teeth 29. The deforming operation can be carried out in several stages. For example, the sections of the legs 28 can be bent with reference to the central portion of the blank by means of suitable profiling rolls, and the thus obtained partially deformed blank is then acted upon by a bending tool which converts the central portion into an annular web 33.

The stamping operation (i.e., the making of the blank which is shown in FIG. 3) necessarily involves the formation of burrs 31 which form part of the teeth 29 and are spaced apart from the flanks 25 of the respective annular portions 20, 21, 22, 23 of the housing 3 when the gripping members 5, 6 are properly installed in the respective grooves 17, 19. At the same time, the blank is formed with rounded or chamfered portions 32 which are outwardly adjacent the burrs 31 and come into actual contact with or are immediately adjacent the respective flanks 25 (see particularly FIG. 4). The making of burrs 31 and rounded portions 32 is attributable to the configuration of the stamping tool which is used to form the blanks. The provision of rounded portions 32 is desirable and advantageous because they enable the teeth 29 to more readily penetrate into the material of the respective pipes 1, 2 in response to rotation of the screws 15, 16 in directions to move the respective webs 33 deeper into the corresponding grooves 17, 19. Of course, the rounded portions 32 can be provided on the blank of FIG. 3 prior to the stamping operation, especially if it is desired or necessary to invariably ensure that the radially innermost portions of the legs 28 will always include pronounced convex portions in sliding contact with the adjacent flanks 25 irrespective of the configuration and cutting action of the selected stamping tool. This even further reduces the likelihood that the legs 28 would be held against sliding movement along the adjacent flanks 25 in response to rotation of the screws 15 and/or 16 in a direction to move the respective webs 33 deeper into the respective grooves 17 and 19, i.e., to ensure that the teeth 29 of the legs 28 will penetrate into or will strongly engage the peripheral surfaces of the respective pipes.

The configuration of the gripping members 5 and 6 is preferably such that, when they are introduced into the respective grooves 17, 19 of the housing 3, their legs 28 come into abutment with the adjacent flanks 25, i.e., that the flanks 25 are engaged by the rounded portions 32 of the respective legs 28. At the same time, the webs 33 of the gripping members 5 and 6 are immediately adjacent or actually abut the surfaces in the deepmost portions of the respective grooves 17 and 19. This ensures that the gripping members 5 and 6 are properly centered or oriented in their grooves, and such centering is enhanced due to the aforementioned trapeziform configuration of the cross-sectional outlines of the gripping members 5, 6 and grooves 17, 19. When the gripping members 5 and 6 are properly installed in the housing 3, the teeth 29 project beyond the internal surface of the housing not later than when the housing is properly applied around the pipes 1, 2 and the neighboring flanges 11, 12 of the shells 13, 14 are clamped to each other to compress the elastic sleeve 4. As mentioned above, at such time the radius R of the circle which is formed by each annulus of teeth 29 or whose diameter equals the outer diameter of the pipe 1 or 2 is somewhat smaller than the radius $R_i$ of the internal surface of the housing 3 i.e., the teeth 29 project beyond the internal surface of the housing. If the coupling is provided with screws 15 and/or 16, such screws can be rotated in a direction to even more reliably engage the teeth 29 with the adjacent portions of the respective pipes 1 and 2. The material of the gripping members 5, 6 can be readily selected in such a way that at least the tips (burrs 31) of the teeth 29 actually penetrate into the adjacent portions of the pipes to thus reduce the likelihood of any axial shifting of the pipes toward or away from each other.

Figure 4:
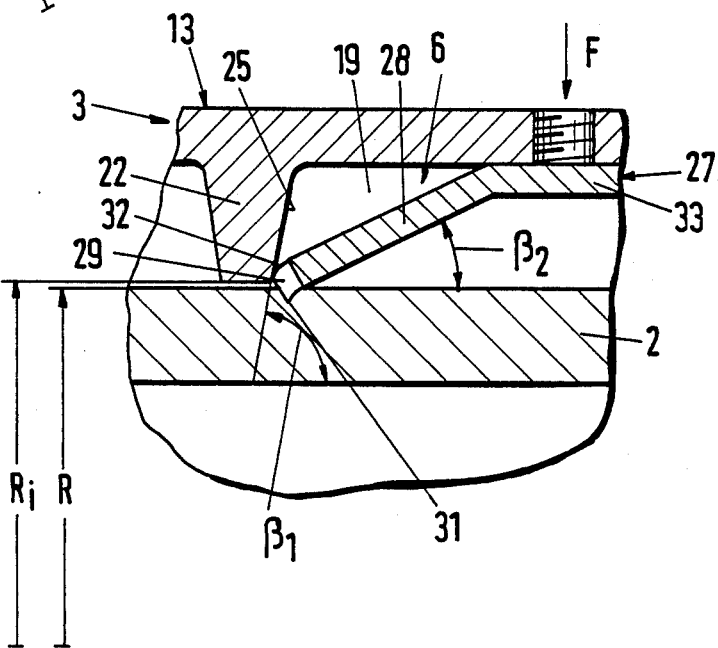
FIG. 4 is an enlarged view of a detail within the phantom-line circle in the upper portion of FIG. 1.

FIG. 4 shows that the gripping members can properly hold the pipes 1 and 2 (only the pipe 2 is shown in FIG. 4) even if the screws 15 and 16 are omitted or are not applied. When the housing 3 is mounted on the end portions of the pipes 1 and 2, it applies against each web 33 a force F which acts radially inwardly and causes the legs 28 to urge their teeth or claws 29 into the adjacent pipe. The force F is divided into two forces which act upon the respective legs 28 and urge such legs against the adjacent flanks 25. This entails a deflection of the respective forces substantially radially inwardly so that the radially innermost portions of the legs 28 (i.e., the portions which are rounded at 32) slide along the adjacent flanges 25 and cause the burrs 31 of the teeth 29 to penetrate into the adjacent pipes. Tightening of the shells 13, 14 around the pipes 1, 2 further entails a radially inward movement of the annular portions 20-23 so that such radially inward movement of the annular portions entails the generation of additional forces which act upon the adjacent legs 28 by way of the respective flanks 25. These forces also urge the teeth 29 radially inwardly and into a pronounced engagement with the respective pipes. Thus, each web 33 tends to move the radially innermost portion of one leg 28 axially of the pipes 1, 2 and away from the innermost portion of the other leg 28 while, at the same time, each annular portion of the housing 3 urges the radially innermost portion of the adjacent web 28 toward the other web, and all of these forces urge the teeth 29 toward the axes of the respective pipes. The just discussed forces ensure that the teeth or claws 29 do not slide along the peripheral surfaces of the respective pipes 1 and 2 during tensioning of the shells 13, 14 because the flanks 25 prevent any spreading of the webs 28 in a direction to move the radially innermost portion of one web away from the radially innermost portion of the other web (as seen in the axial direction of the housing 3). Such slippage or sliding of the teeth 29 along the peripheral surfaces of the pipes 1, 2 is prevented even though the angles $beta_2$ are relatively small. Relatively small angles $beta_2$ are normally desirable and advantageous because this enables the legs 28 of the gripping members 5, 6 to act not unlike thrust or push plates which can take up pronounced tensional as well as pronounced compressive stresses in the axial direction of the pipes 1 and 2. If the magnitude and/or distribution of forces acting upon the legs 28 is such that the respective angles $beta_2$ increase, the tips (31) of the teeth 29 are urged radially inwardly with a correspondingly increased force to even further reduce the likelihood of any axial shifting of the pipes 1 and 2 relative to each other. It will be seen that the gripping members 5 and 6 can stand pronounced forces which tend to pull the pipes 1 and 2 axially and away from each other as well as pronounced forces tending to move the pipes toward each other which could affect the integrity of the elastic rib 26 between the end faces of the pipes. As mentioned above, the ability of the gripping members 5, 6 to stand pronounced forces tending to move the pipes 1 and 2 axially toward or away from each other can be enhanced still further by means of the screws 15, 16 which can be applied to increase the force F, i.e., that force which is applied to the web 33 in order to tend to reduce the respective angles $beta_2$ and to thereby urge the radially innermost portions of the respective legs 28 against the adjacent flanks 25 which, in turn, results in deeper penetration of teeth 29 into the peripheral surfaces of the respective pipes. The burrs 31 enhance the ability of the teeth 29 to penetrate into the pipes, and the rounded portions 32 enhance the ability of the legs 28 to urge their teeth 29 toward and into the peripheral surfaces of the respective pipes. Moreover, the rounded portions 32 compel the legs 28 to slide along the adjacent flanks 25 as soon as the legs are acted upon by the respective web 33 and/or by the adjacent annular portions 20, 21 or 22, 23 of the housing 3.

The establishment of an annular gap between the internal surface of the housing 3 and the peripheral surfaces of the pipes 1, 2 (note the difference between the radii R and $R_i$ in FIG. 4) is desirable and advantageous because this ensures that the forces F cannot move the shells 13, 14 into direct frictional engagement with the pipes 1, 2 (this would reduce the effectiveness of the gripping members 5, 6 or would render such gripping members ineffective).

When the pipe 1 is pulled axially and away from the pipe 2 and/or vice versa, the right-hand leg 28 of the gripping member 5 (reference being had to FIG. 1) and the left-hand leg 28 of the gripping member 6 immediately tend to slide along the flanks 25 of the respective annular portions 21, 22 to cause deeper penetration of their teeth 29 into the respective pipes and to thus prevent any, or to permit only negligible, axial movements of the pipes away from each other. Analogously, when the pipe 1 tends to move axially toward the pipe 2 and/or vice versa, the left-hand leg 28 of the gripping member 5 and the right-hand leg 28 of the gripping member 6 immediately tend to slide along the flanks 25 of the respective annular portions 20, 23 so that their teeth 29 penetrate deeper into the respective pipes and hold these pipes against any, or against any appreciable, axial movement toward each other. This contributes to longer useful life of the elastic rib 26 on the sleeve 4.

The provision of discrete annular grooves 17, 19 for the gripping members 5 and 6 facilitates insertion, centering and orientation of the gripping members in optimum positions with little loss in time. The feature that the grooves 17, 19 are, or can constitute, circumferentially complete annular depressions in the internal surface of the housing 3 also contributes to simplicity and predictability of insertion, orientation and centering of the gripping members 5 and 6, especially if each of these gripping members constitutes a properly deformed one-piece blank of metallic sheet material. Moreover, it is simpler and less expensive to provide the housing 3 with circumferentially complete grooves 17, 19 and to make each gripping member of a single piece of deformable sheet material. The gripping members 5, 6 can be installed simultaneously or one after the other.

An additional important advantage of the illustrated gripping members 5 and 6 is that the rounded portions 32 of their legs 28 are highly unlikely to penetrate into the material of the adjacent annular portions 20–23, even when the gripping members are subjected to pronounced stresses which tend to reduce the angles $beta_2$ and to thus urge the radially innermost portions of the legs 28 toward the adjoining flanges 25. Moreover, the rounded portions 32 promote a change in the direction of forces which are applied by the legs 28 so that such forces are deflected in parallelism with the respective flanks 25 and urge the teeth 29 radially toward the axis of the respective pipes. It has been found that the aforementioned ranges of inclination of the legs 28 (angles $beta_2$) with reference to the axis of the housing 3 are particularly effective in ensuring that the teeth 29 of the legs 28 hold the pipes 1 and 2 against axial movement toward or away from each other.

While it is also possible to select the dimensions of the legs 28 in such a way that the internal surface of the housing 3 can actually engage the peripheral surfaces of the pipes 1 and 2 when the mounting of the coupling on the end portions of the pipes is completed, the establishment and maintenance of a gap between the internal surface of the housing 3 and the peripheral surfaces of the pipes is preferred at this time for the aforediscussed reasons, i.e., the teeth 29 remain fully effective to hold the pipes against axial movement toward or away from each other under any and all foreseeable circumstances.

Full installation of each gripping member in a discrete groove of the housing 3 ensures that the teeth 29 cannot become disengaged from the respective pipes, even in response to the application of very pronounced forces F which, in the absence of annular portions 20, 21 and 22, 23 and their flanks 25, could convert each gripping member into a substantially cylindrical body whose legs would form short cylinders and whose teeth 29 would extend toward the adjoining flanks 25 rather than into the respective pipes. The flanks 25 limit the extent to which the gripping members 5 and 6 can be flattened by the housing 3 so that, once the rounded portions 32 of the legs 28 contact the respective flanks 25, any further tendency of the housing 3 to flatten the gripping members merely entails further penetration of the teeth 29 into the adjacent pipes. At least the major part of the force F which is generated when the rounded portions 32 abut the respective flanks 25 is effective to urge the teeth 29 into the adjacent pipes. This takes place in spite of the fact that the angles $beta_2$ are or can be relatively small acute angles.

The coupling of FIGS. 1 to 4 can be modified in a number of ways without departing from the spirit of the invention. For example, the housing 3 can be provided with one or more hinges which replace one of the flanges 11 and the adjacent flange 12. Such hinge or hinges can include leaves and pintles, or they can simply constitute one or more elastic strips which allow the shells 13, 14 to perform angular movements relative to each other about an axis which is parallel to the common axis of the pipes 1, 2.

Regardless of the exact nature of the housing 3, the grooves 17, 18 and 19 are accessible when the housing is open so as to allow for convenient insertion of sections of the gripping members 5, 6 and of the elastic sleeve 4 (the latter can constitute a circumferentially complete annulus which is slipped onto the end portions of the pipes 1, 2 prior to application of the housing 3). The elasticity of one-piece gripping members should suffice to allow for their opening so that they can be slipped onto the respective pipes. The situation is even simpler if each gripping member is assembled of two or more arcuate sections which are individually insertable into the respective groove 17 or 19. The utilization of one-piece gripping members is preferred in many instances because they can be mass-produced at a lower cost.

The housing 3 or an analogous housing can be provided with a single groove (17 or 19) for a single gripping member. This suffices if the housing is to be nonmovably coupled to a single pipe or to a similar object, or if only one of the pipes 1, 2 is to be held against axial movement relative to the housing. It is also possible to use the improved coupling as a means for connecting one of the pipes 1, 2 with a tubular or solid protuberance on the wall of a building or the like, for example, to secure a pipe to a tubular nipple. One half of the housing can slide relative to the nipple so as to ensure that the coupling will be capable of compensating for thermally induced axial expansion or contraction of the pipe which is connected with the nipple. Analogously, the housing can be used between two coaxial pipes to allow axial movements of such pipes relative to each other. This can be achieved by omitting one of the gripping members. Finally, it is also possible to provide the housing with three or more grooves for discrete gripping members, for example, with two grooves for each of the pipes 1, 2 so that each pipe is even more reliably held against axial movement.

If the housing 3 is used to axially movably couple a pipe (e.g., the pipe 1) to a fixedly mounted projection (e.g., a nipple which replaces the pipe 2), the housing can be provided with a single annular groove for a single gripping member (e.g., with the groove 19 for the gripping member 6) which ensures that the housing cannot move axially of the fixedly mounted projection but the pipe 1 can move axially of the projection, e.g., in response to thermally induced axial expansion or contraction of the pipe 1. Alternatively, such housing can be provided only with the groove 17 for the gripping member 5 which then prevents axial movements of the housing and pipe 1 relative to each other but enables the housing to move axially with reference to the projection in response to thermally induced axial expansion or contraction of the pipe 1. The sleeve 4 or an equivalent packing element may but need not always be necessary in such types of couplings.

The housing 3 of the coupling which is shown in FIG. 5 is provided with a single nearly circumferentially complete groove 17' which extends all the way from the annular portion 20 to the annular portion 23. This groove is interrupted only in the regions of the two pairs of flanges 11, 12 on the semicylindrical shells 13, 14 of the housing 3. The cross-sectional outline of the groove 17' has a substantially trapeziform shape and the internal flanks 25 of the annular portions 20, 23 make with the axis of the housing 3 relatively large acute angles beta1. The lines 15', 16' denote means for securing or fastening the webs 33 of the annular gripping or clamping members 5, 6 to the shells 13 and 14; such securing or fastening means can include screws, rivets, spot welds or the like. The gripping member 5 can be secured to the housing 3 by two or more fastening means 15', and the coupling can comprise two or more fastening means 16' for securing the gripping member 6 to the housing 3 adjacent the annular portion 23. For example, the coupling can be provided with three or more equidistant fastening means 15' and 16'.

The rounded portion 32 of the left-hand leg 28 of the gripping member 5 is immediately adjacent or actually abuts the flank 25 of the annular portion 20, and the rounded portion 32 of the right-hand leg 28 of the gripping member 6 is immediately adjacent or actually abuts the flank 25 of the annular portion 23. The webs 33 of the gripping members 5, 6 abut the internal surface of the housing 3.

When the diameter of the housing 3 is being reduced by bolts 7 and 8, the housing applies to the webs 33 a force F and such force is divided to be transmitted to the respective legs 28 so that the claws 29 of such legs are caused to penetrate substantially radially into the material of the respective pipes 1 and 2. The left-hand leg 28 of the gripping member 5 and the right-hand leg of the gripping member 6 are then caused to bear against the respective flanks 25, and this also promotes penetration of the corresponding claws 29 into the material of the adjacent pipes. Furthermore, as the shells 13, 14 are caused to move nearer to the peripheral surfaces of the pipes 1 and 2, the flanks 25 of the annular portions 20 and 23 bear against the rounded portions 32 of the adjacent legs 28 to even further enhance penetration of the claws 29 on such legs into the adjacent pipes. The just discussed mode of applying forces to the left-hand leg 28 of the gripping member 5 and to the right-hand leg 28 of the gripping member 6 invariably ensures that the claws 29 of these legs an not slide along the respective pipes when the bolts 7 and 8 are applied to reduce the diameter of the housing 3. Such sliding of the claws 29 which are adjacent the annular portions 20 and 23 is prevented even if the angles $beta_2$ are relatively small, i.e., even if the inclination of the flanks 25 considerably exceeds the inclination of the adjacent legs 28. As mentioned in connection with the coupling of FIGS. 1 to 4, relatively small angles $beta_2$ are normally desirable and advantageous because this enables the gripping members 5 and 6 to act not unlike push or thrust plates which can take up pronounced axial stresses (be it tensional or compressive stresses) which are applied to the respective pipes when the coupling is in actual use. If the angles $beta_2$ increase during application of the bolts 7 and 8, the force with which the claws 29 of the respective legs 28 tend to penetrate into the adjacent pipes is on the increase which even further reduces the likelihood of slippage of such legs in the axial direction of the housing 3. Pronounced resistance to slippage is desirable because the internal annular rib 26 of the elastic packing ring or sleeve 4 between the gripping members 5 and 6 could be destroyed in response to appreciable axial shifting of the pipe 1 toward the pipe 2 and/or vice versa.

FIG. 6 shows a portion of a third coupling wherein the inclination ($beta_2$) of one leg 28 of the illustrated gripping member 5 deviates considerably from the inclination ($beta_3$) of the other leg 28'. The illustrated angle $beta_3$ is approximately 60 degrees and the angle $beta_2$ can equal or approximate half the angle $beta_3$. Such design of the gripping member 5 reduces its bulk, weight and cost (savings in material because the leg 28' is much shorter than the leg 28 as seen in the axial direction of the pipe 1 and housing). Moreover, and if the pipe 1 tends to move axially to the left, as seen in FIG. 6, the angle $beta_3$ tends to increase so that the claws of the leg 28' tend to penetrate further into the material of the pipe and the leg 28' increases its resistance to axial movement of the pipe 1 away from the other pipe. The angle $beta_3$ is but need not always be smaller than the angle $beta_1$.

The other gripping member of the coupling which is shown in FIG. 6 is or can be a mirror image of the gripping member 5.

The fastening means 15' and 16' can be omitted in each of the couplings which are shown in FIGS. 5 and 6 if these couplings are not expected to be required to stand pronounced stresses tending to move the pipes 1 and 2 toward each other, i.e., stresses of a nature which would tend to move the gripping members of FIGS. 5 and 6 away from the adjacent annular portions 20, 23 of the respective housings 3. Such fastening means can also be omitted if the housing 3 of FIGS. 5 or 6 is replaced with a housing which is similar to the housing 3 of FIG. 1 wherein each of the gripping members is confined in a discrete groove so that each of the legs 28 and 28' is adjacent an annular portion of the respective housing. Alternatively, the aforediscussed muff which can be used to surround the elastic sleeve 4 can be provided with inwardly extending annular end portions which replace the annular portions 21 and 22 of the housing 3 of FIG. 1 and are adjacent the inner legs 28 or 28' of the gripping members shown in FIGS. 5 and 6. Thus, each of the gripping members 5, 6 can be disposed in a groove which is defined by two integral annular portions of the housing (such as the annular portions 20, 21 and 22, 23 of FIG. 1) or which is defined by an annular portion of the housing (such as the portion 20 or 23) and an annular portion of a muff which is confined in the housing and surrounds the elastic sleeve 4.

An advantage of a housing of the type shown in FIGS. 5 and 6 (without the annular portions 21 and 222 is that such housing can be made of simple and relatively inexpensive sheet material in available deforming machines.

It has been found that the couplings of FIGS. 5 and 6 can also stand pronounced axial stresses which tend to move the pipes 1 and 2 toward or away from each other. This holds true even if the claws of legs 28 or 28' which are not immediately adjacent the annular portions 20, 23 of the respective housing 3 do not penetrate well into the material of the adjacent pipes. The claws of the legs 28 which are adjacent the annular portions 20 and 23 invariably penetrate into the material of the pipes 1 and 2 so that they offer a pronounced resistance to axial movement of the pipes away from each other. As explained above, the rather strongly inclined legs 28' (of which only one can be seen in FIG. 6) can offer a strong resistance to axial movement of the pipe 1 away from the pipe 2 and/or vice versa so that such coupling can reliably and practically instantaneously oppose all axial movements of the pipes with reference to each other. The ability of the gripping members in the couplings of FIGS. 5 and 6 to oppose all axial movements of the pipes relative to each other is enhanced if such gripping members are actually fastened to the respective housing (as described in connection with FIG. 5 and as shown at 15' and 16').

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the instant contribution to the art and, therefore, such adaptations should and are intended to be comprehended within the meaning and range of equivalence of the appended claims.

I claim:

1. A coupling for pipes and similar objects, comprising a tubular housing having an internal surface arranged to surround the objects to be coupled to each other and at least one annular groove in said surface, said housing including two annular portions flanking said groove and having oppositely inclined flanks which diverge toward said internal surface and make first acute angles with the axis of said housing; and an annular gripping member in said groove, said gripping member including a web and two oppositely inclined legs which are movable relative to each other in the axial direction of said gripping member, said legs flanking said web and having teeth in the region of said internal surface to penetrate into the object which is surrounded by said groove in response to the application to said web of a radial force which acts through said housing, at least one of said legs making with said axis a second acute angle smaller than said first angle, the teeth of said one leg being closely or immediately adjacent one annular portion of said housing.

2. The coupling of claim 1, wherein the teeth of both said legs are closely or immediately adjacent different annular portions of said housing.

3. The coupling of claim 2, wherein said internal surface has an additional annular groove which is spaced apart from said one groove in the axial direction of said housing so that each of said grooves surrounds a different one of the objects which are surrounded by said internal surface, said housing having additional annular portions which flank said additional groove and further comprising an additional gripping member in said additional groove.

4. The coupling of claim 1, wherein said gripping member comprises a plurality of interconnected arcuate sections.

5. The coupling of claim 1, wherein said gripping member has a substantially U-shaped cross-sectional outline.

6. The coupling of claim 5, wherein said groove has a substantially trapezoidal cross-sectional outline.

7. The coupling of claim 1, wherein said gripping member is a one-piece member having a plurality of neighboring arcuate sections.

8. The coupling of claim 1, wherein said gripping member includes at least two neighboring arcuate sections of deformed sheet material and the teeth of legs of said arcuate sections form arcs with radii of curvature slightly less than the radius of said internal surface, said gripping member having recesses between the legs of said neighboring arcuate sections.

9. The coupling of claim 8, wherein at least some of said teeth have a sawtooth shaped profile.

10. The coupling of claim 8, wherein the width of said recesses decreases in directions from the respective teeth toward the web of said gripping member.

11. The coupling of claim 8, wherein said neighboring sections are stampings and have burrs forming part of the teeth of said sections.

12. The coupling of claim 11, wherein said burrs are spaced apart from the respective annular portions of said housing.

13. The coupling of claim 8, wherein the teeth of said one leg have rounded portions adjacent said one annular portion of said housing.

14. The coupling of claim 1, wherein the inclination of said legs is between 20° and 30°.

15. The coupling of claim 14, wherein said inclination is approximately 25°.

16. The coupling of claim 1, wherein said teeth project radially inwardly beyond said internal surface.

17. The coupling of claim 1, further comprising means for biasing said gripping member radially inwardly.

18. The coupling of claim 17, wherein said housing has at least one tapped bore outwardly adjacent the web of said gripping member and said biasing means includes a threaded portion disposed in said bore and bearing upon said web.

19. The coupling of claim 1, further comprising a second annular gripping member in said groove, said one leg of said one gripping member being closely or immediately adjacent one of said annular portions and one leg of said second gripping member being closely or immediately adjacent the other of said annular portions.

20. The coupling of claim 19, wherein the other leg of said one gripping member and the other leg of said second gripping member are spaced apart from each other and from said annular portions.

21. The coupling of claim 1, further comprising means for fastening said gripping member to said housing.

22. The coupling of claim 1, wherein the other of said legs makes with said axis a third acute angle greater than said second acute angle.

23. The coupling of claim 1, wherein said housing consists of sheet metal.

* * * * *